(12) United States Patent
Heurlin et al.

(10) Patent No.: US 12,479,395 B2
(45) Date of Patent: Nov. 25, 2025

(54) SIDE IMPACT PROTECTION ASSEMBLY FOR A VEHICLE

(71) Applicant: Volvo Car Corporation, Gothenburg (SE)

(72) Inventors: Fredrik Heurlin, Gothenburg (SE); Magnus Björklund, Gothenburg (SE); Peter Setterberg, Partille (SE); Peter Adolfsson, Gothenburg (SE); Katarina Bohman, Gothenburg (SE); Jonas Östh, Gothenburg (SE); Andreas Carlsson, Gothenburg (SE); Johan Rosenberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/207,277

(22) Filed: Jun. 8, 2023

(65) Prior Publication Data

US 2024/0409055 A1 Dec. 12, 2024

(51) Int. Cl.
*B60R 21/231* (2011.01)
*B60R 21/0134* (2006.01)
*B60R 21/0136* (2006.01)
*B60R 21/233* (2006.01)
*B60R 21/264* (2006.01)
*B60R 21/268* (2011.01)
*B60R 21/01* (2006.01)

(52) U.S. Cl.
CPC .... *B60R 21/23138* (2013.01); *B60R 21/0134* (2013.01); *B60R 21/0136* (2013.01); *B60R 21/233* (2013.01); *B60R 21/264* (2013.01); *B60R 21/268* (2013.01); *B60R 2021/01218* (2013.01); *B60R 2021/23107* (2013.01); *B60R 2021/23146* (2013.01)

(58) Field of Classification Search
CPC .......... B60R 21/23123; B60R 21/0134; B60R 21/0136; B60R 21/233; B60R 21/264; B60R 21/268; B60R 2021/01218; B60R 2021/23107; B60R 2021/23146; B60R 21/207
See application file for complete search history.

(56) References Cited

U.S. PATENT DOCUMENTS

| | | | | |
|---|---|---|---|---|
| 2009/0243268 | A1* | 10/2009 | Suzuki | B60R 21/23138 |
| | | | | 280/730.2 |
| 2011/0133435 | A1* | 6/2011 | Sadr | B60R 21/239 |
| | | | | 280/730.1 |
| 2011/0169250 | A1* | 7/2011 | Breuninger | B60R 21/237 |
| | | | | 280/730.2 |
| 2013/0026802 | A1* | 1/2013 | Freienstein | B60N 2/4279 |
| | | | | 701/45 |

* cited by examiner

*Primary Examiner* — Jason D Shanske
*Assistant Examiner* — Scott Lawrence Strickler
(74) *Attorney, Agent, or Firm* — Clements Bernard Walker; Christopher L. Bernard; Devin Cummins

(57) ABSTRACT

A collision protection system for a vehicle, the collision protection system including a seat having a seat back and at least one lateral support coupled to the seat back, where the at least one lateral support deploys based on one or more collision policies. The collision protection system further includes a side airbag, where the side airbag deploys based on the one or more collision policies, and where the at least one lateral support deploys between the seat and the side airbag to protect a user occupying the seat during a collision.

20 Claims, 6 Drawing Sheets

SIDE IMPACT PROTECTION ASSEMBLY FOR A VEHICLE

The present disclosure relates generally to automotive field. During a collision between two vehicles, where one vehicle collides into the side of another vehicle, high-severity side impacts can result in significant intrusions of vehicle side structure (e.g., door, B-pillar, etc.) toward the occupant. Vehicles typically have side-impact protection such as side airbags to protect passengers during a collision. Heavier vehicles such as electrical vehicles can lead to larger intrusions creating a need for more efficient side-impact protection. In current solutions, occupant retention is mainly handled by side airbags. These airbags require significant relative movement of the occupant into the bag before retention can be achieved. Side airbags are typically activated only in high-severity collisions resulting in a potential performance gap at lower speeds.

The present introduction is provided as background context only and is not intended to be limiting in any manner. It will be readily apparent to those of ordinary skill in the art that the concepts and principles of the present disclosure may be implemented in other applications and contexts equally.

SUMMARY

The present disclosure relates to a collision protection system for a vehicle. The collision protection system includes at least one seat, at least one lateral support coupled to the back support portion of the seat, and at least one side airbag. Both the lateral support and side airbag deploy based on one or more collision policies. The lateral support deploys between the seat and the side airbag to protect a user occupying the seat during a collision. Optionally, at least one collision policy causes the at least one lateral support to deploy in response to a pre-crash warning signal. Also, at least one collision policy causes the at least one lateral support to deploy in response to a crash detection signal.

In one illustrative embodiment, the present disclosure provides a collision protection system for a vehicle. The collision protection system includes a seat having a seat back. The collision protection system further includes at least one lateral support coupled to the seat back, where the at least one lateral support deploys based on one or more collision policies. The collision protection system further includes a side airbag. The side airbag deploys based on the one or more collision policies, and where the at least one lateral support deploys between the seat and the side airbag to protect a user occupying the seat during a collision. Optionally, the at least one lateral support deploys using a pyrotechnic or compressed gas inflater. The at least one lateral support deploys by inflating against a side of the user. The at least one lateral support includes two lateral supports, and where the two lateral supports deploy to enhance protection of the user. At least one collision policy of the one or more collision policies causes the at least one lateral support to deploy in response to a pre-crash warning signal. At least one collision policy of the one or more collision policies causes the at least one lateral support to deploy in response to a crash detection signal. At least one collision policy of the one or more collision policies causes the at least one lateral support to deploy at a slower rate than a deployment rate of the side airbag.

In another illustrative embodiment, the present disclosure provides a side-impact protection assembly for a vehicle. The side-impact protection assembly includes at least one lateral support coupled to a seat back of a seat, where the at least one lateral support deploys based on one or more collision policies. The side-impact protection assembly further includes a side airbag. The side airbag deploys based on the one or more collision policies, and where the at least one lateral support deploys between the seat and the side airbag to protect a user occupying the seat during a collision. Optionally, the at least one lateral support deploys using a pyrotechnic or compressed gas inflater. The at least one lateral support deploys by inflating against a side of the user. The at least one lateral support includes two lateral supports, and where the two lateral supports deploy to enhance protection of the user. At least one collision policy of the one or more collision policies causes the at least one lateral support to deploy in response to a pre-crash warning signal. At least one collision policy of the one or more collision policies causes the at least one lateral support to deploy in response to a crash detection signal. At least one collision policy of the one or more collision policies causes the at least one lateral support to deploy at a slower rate than a deployment rate of the side airbag.

In a further illustrative embodiment, the present disclosure provides a method including detecting a collision indication signal, and deploying at least one lateral support coupled to a seat back of a seat, where the at least one lateral support deploys based on one or more collision policies. The method further includes deploying a side airbag, where the side airbag deploys based on the one or more collision policies, and where the at least one lateral support deploys between the seat and the side airbag to protect a user occupying the seat during a collision. Optionally, the at least one lateral support deploys using a pyrotechnic or compressed gas inflater. The at least one lateral support deploys by inflating against a side of the user. The at least one lateral support includes two lateral supports, and where the two lateral supports deploy to enhance protection of the user. At least one collision policy of the one or more collision policies causes the at least one lateral support to deploy in response to a pre-crash warning signal. At least one collision policy of the one or more collision policies causes the at least one lateral support to deploy in response to a crash detection signal.

BRIEF DESCRIPTION OF THE DRAWINGS

The present disclosure is illustrated and described with reference to the various drawings, in which like reference numbers are used to denote like system components and/or method steps, as appropriate.

DETAILED DESCRIPTION

Figure 1:
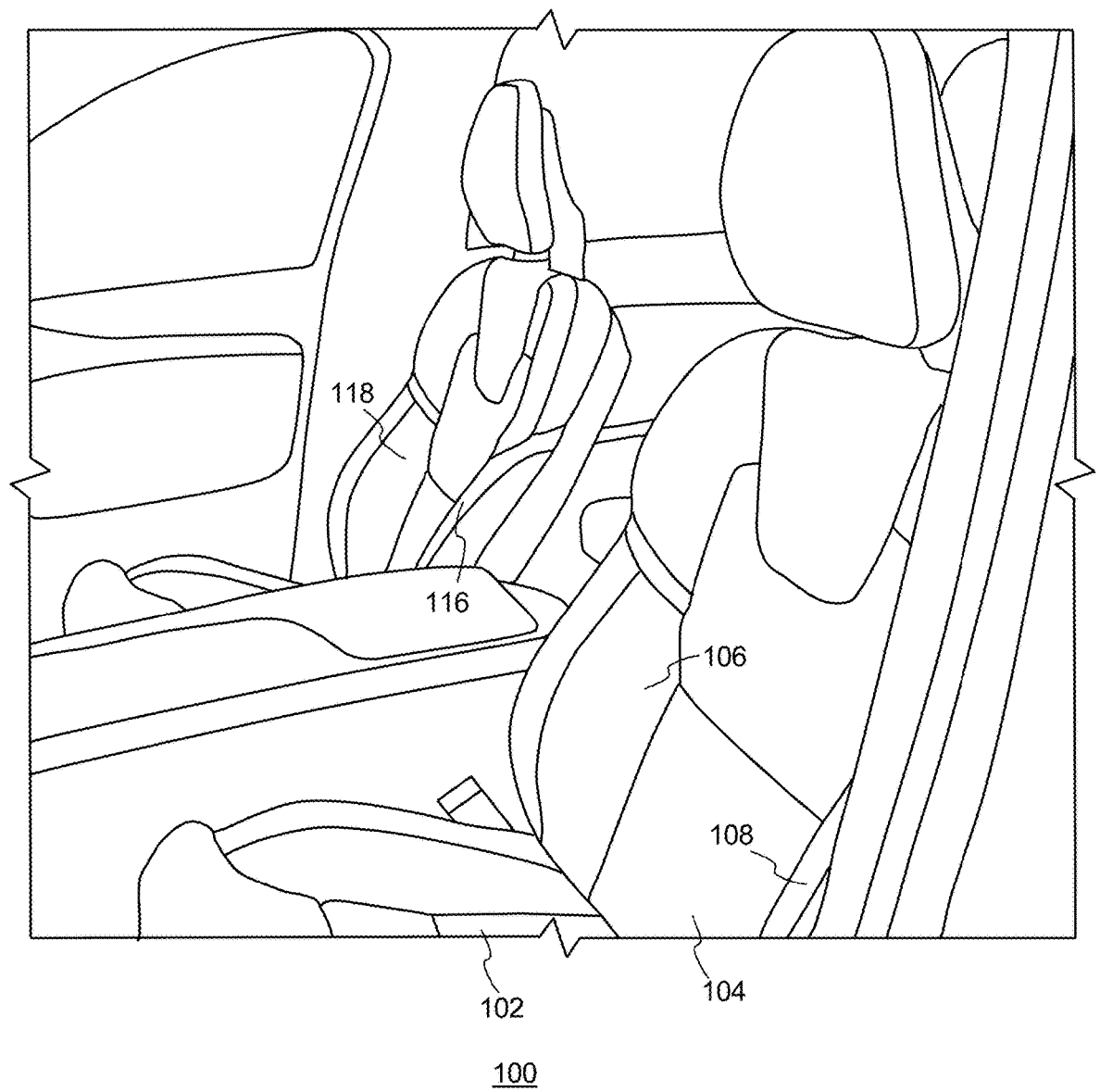
FIG. 1 is a perspective view of one illustrative embodiment of an interior environment of a vehicle.

FIG. 1 is a perspective view of one illustrative embodiment of an interior environment 100 of a vehicle. Shown is a seat 102 having a seat back 104. Integral to the seat back 104 are a lateral support 106 and a lateral support 108. Similarly, next to the seat 102 is another seat with a lateral support 116 and a lateral support 118 integrated into the respective seat back. The lateral supports 106 and 116 may also be referred to as inner lateral supports 106 and 116 in that they are positioned on the inner-most side or proximate to the central line of the vehicle interior. The lateral supports 108 and 118 may also be referred to as outer lateral supports 108 and 118 in that they are positioned on the outer-most side or proximate to the vehicle exterior.

Figure 2:
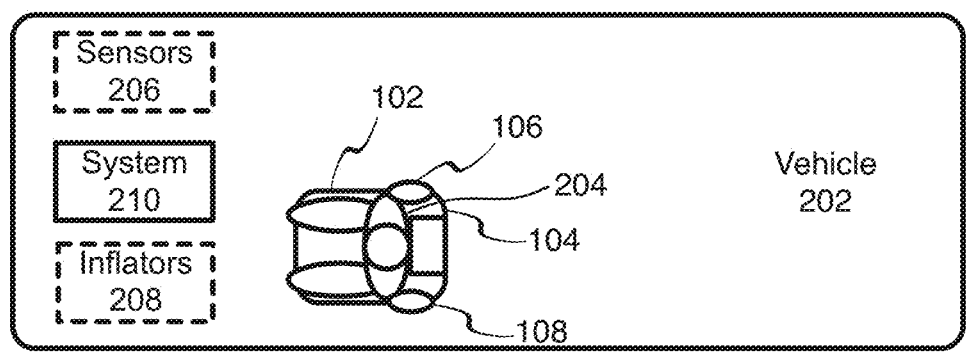
FIG. 2 is a top view of one illustrative embodiment of an exterior environment of a vehicle.

FIG. 2 is a top view of one illustrative embodiment of an exterior environment 200 of a vehicle 202. The vehicle 202 may be used to implement the vehicle shown in FIG. 1. For example, shown are the seat 102 having the seat back 104, the lateral support 106, and the lateral support 108.

Also shown is a user 204 seated in the seat 102. The terms user and occupant may be used interchangeably. In this example scenario, one occupant is shown for ease of illustration. This example occupant may represent the driver of the vehicle 202, who controls the vehicle 202. In some scenarios, depending on the country and on what side the steering is located, this occupant may represent a passenger of the vehicle 202. In some scenarios, the vehicle may be autonomous vehicle that drives with no driver, where all occupants are passengers.

Embodiments described herein apply to all seats of a vehicle. Such embodiments are directed to side-impact protection, which is independent from the location of a steering wheel, if any. Other occupants not shown in this example may be referred to as passengers. As such, an occupant may be a driver or a passenger.

The vehicle 202 also includes sensors 206, inflators 208, and a system 210. The sensors 206 may represent a group of sensors, which may include external and internal sensors (not shown). The number of sensors 206 and the locations of the sensors 206 may vary, depending on the particular implementation. Example embodiments directed to the sensors 206 and the inflators 208 are described in more detail herein.

The vehicle 202 also includes airbags (not shown), which include front airbags and side airbags. The front airbags when in non-deployed states may be positioned behind the steering wheel in front of the driver, and behind the dashboard panel proximate to a front passenger. Side airbags when in non-deployed states may be positioned proximate to side B-pillars (not shown) or at the outer side of the seat 102 or outer side of the seat back 104 closest to the exterior of the vehicle. The particular airbag locations may vary, depending on the particular implementation.

As described in more detail herein, the airbags deploy upon impact or just before impact, depending on the particular implementation. The inflators 208 may represent a group of inflators that are spread out around the vehicle 202 proximate to respective airbags. The number of inflators 208 and the locations of the inflators 208 may vary, depending on the particular implementation.

As shown, the lateral supports 106 and 108 are coupled to the seat back 104 of the seat 102. The technique for coupling the lateral supports 106 and 108 into the seat back 104 may vary, depending on the particular implementation. For example, the lateral supports 106 and 108 may be attached to or integrated into the seat back 104 of the seat 102. When the lateral supports 106 and 108 are in non-deployed configurations or states, both of the lateral supports 106 and 108 provide lateral support for the user while the vehicle 202 is in a sharp turn. As such, the lateral supports 106 and 108 function as bolsters when in a non-deployed state, and may be referred to as bolsters, or inflatable side bolsters.

As described in more detail herein, one or more of the lateral supports 106 and 108 deploy based on one or more collision policies. In various embodiments, when the lateral supports 106 and 108 are in a non-deployed configuration or state, the lateral supports 106 and 108 function side bolsters that provide lateral support for the user when the vehicle is making a sharp turn.

For ease of illustration, FIG. 2 shows one block for each of the seat 102 and associated components, the sensors 206, the inflators 208, and the system 210. These blocks 102, 206, 208, and 210 may represent multiple seats, seat backs, sensors, inflators, and systems. In other implementations, environment 200 may not have all of the components shown and/or may have other elements including other types of elements instead of, or in addition to, those shown herein.

While the system 210 performs implementations described herein, in other implementations, any suitable component or combination of components associated with the system 210 or any suitable processor or processors associated with the system 210 may facilitate performing the implementations described herein.

Figure 3:
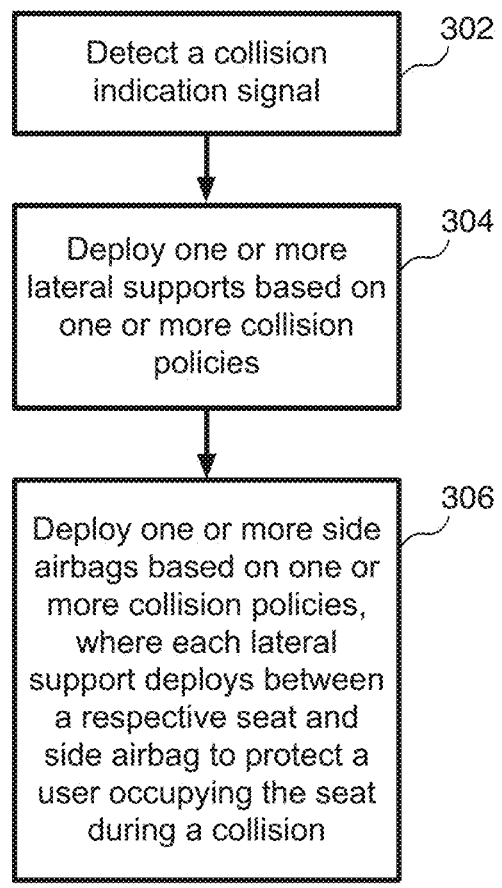
FIG. 3 is an example flow diagram of an illustrative method for enhancing side impact protection of passengers in a vehicle during a collision.

FIG. 3 is an example flow diagram of an illustrative method for enhancing side impact protection of occupants in a vehicle during a collision. Referring to both FIGS. 2 and 3, a method is initiated at block 302, where a system such as the system 210 detects a collision indication signal. In various embodiments, a collision indication signal may include pre-crash warning signals and crash detection signals. As described in more detail herein, a pre-crash warning signal is triggered when the system collects sufficient data to predict an imminent or impending crash before impact from a crash. A crash detection signal is triggered when the system detects an actual impact from a crash.

Figure 4:
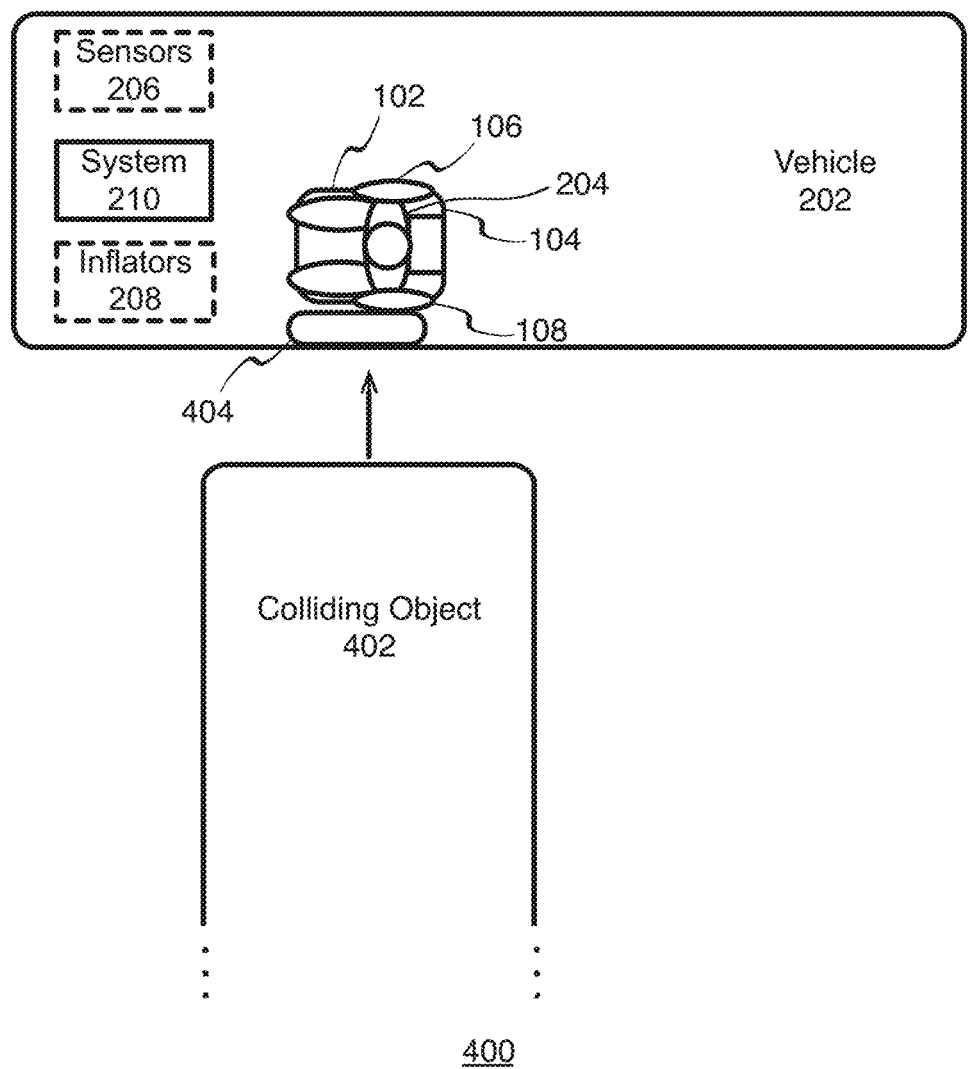
FIG. 4 is a top view of one illustrative embodiment of an exterior environment of vehicle.

FIG. 4 is a top view of one illustrative embodiment of an exterior environment 400 of the vehicle 202. Shown are the seat 102, the seat back 104, the lateral support 106, and the lateral support 108. Also shown is the user 204 seated in the seat 102. The vehicle 202 also includes the sensors 206, the inflators 208, and the system 210. Also shown is a side airbag 404.

As shown, a colliding object 402, which may be another vehicle, is about to make impact or collide with the vehicle 202. As shown, in this example, the airbag 404 is deployed just before impact based on a pre-crash warning signal. In other example scenarios, the airbag 404 may be deployed at impact based on a crash detection signal. In any of these scenarios, when the colliding object 402 makes contact with the vehicle 202, the airbag 404 is deployed. As described in more detail herein, in various embodiments, the lateral support 108 is already deployed/inflated before the airbag 404 is deployed.

Referring to both FIGS. 3 and 4, at block 304, the system deploys one or more lateral supports 108 and 106 coupled to the seat back 104 of the seat 102. For example, the system deploys at the least outer lateral support 108. In various embodiments, the system may deploy both the lateral supports 106 and 108. As such, embodiments described in the context of the lateral support 108 also apply to lateral support 106. As indicated above, the lateral supports 106 and 108 deploy based on one or more collision policies. Example collision policies are described in more detail herein.

As indicated above, when in non-deployed configurations or states, the lateral supports 106 and 108 function as bolsters and provide lateral support for the user while the vehicle 202 is in a sharp turn. Comparing FIGS. 2 and 4, the lateral support 108 when deployed inflates such that it elongates forward, toward the front of the vehicle 202. When deployed, the lateral support 108 also inflates such that it inflates toward and against the body of the user 204. As a result, the lateral support 108 functions as a buffer between the side airbag 404 and the seat 102/the user 204, thereby protecting the user 204 from impact not only from the colliding object 402 but also from the airbag 404.

In various embodiments, the side airbag 404 exits its hidden storage compartment in order to inflate. Unlike the side airbag 404, the lateral support 108 simply inflates. In other words, the lateral support 108 simply expands to constrain the user 204. When fully deployed, the lateral support 108 remains comfortable and relatively soft when in contact with the user 204.

Because the lateral support 108 is not an airbag and functions as an inflatable bolster, the system may deflate the lateral support 108 from a deployed state back to an undeployed state by simply causing a predetermined amount of air to be released from the lateral support 108. For example, the predetermined amount may be enough to return to its default undeployed state. This may be advantageous during slow collisions or low impact where the lateral support 108 protects the user even if the side airbag 404 does not deploy.

In this illustrative embodiment, the lateral support 108 deploys using a pyrotechnic or compressed gas inflater such as one of the inflators 208. This enables the lateral support 108 to inflate immediately. This also enables the lateral support 108 to deploy and fully inflate before the side airbag 404 fully deploys. This ensures that the lateral support 108 protects the user 204 from impact from the colliding object 402 as well as from the side airbag 404.

Also, as described herein, the system may deploy the lateral support before a collision. This enables the lateral support to be deployed rapidly and well before an actual collision. As such, the system may enhance protection the occupant well before a collision.

In this illustrative embodiment, the lateral support deploys by inflating against the side of the user's body. At impact, the lateral support 108 is already making contact/engaging the side of the user body. By deploying against the side of the user's body, the lateral support minimizes or eliminates a gap between the user's body and the lateral support. With little or no gap or distance between the lateral support 108 and the user's body, movement of the user and impact on the user is minimal.

As such, the occupant is cradled in the seat sooner with more restraint and thus more safety. As indicated herein, occupant retention is mainly handled by the side airbags, and these airbags require significant relative movement of the occupant into the bag before retention can be achieved. As such, the inflated lateral support increases efficiency with an activated side airbag, as the occupant loads the airbag through the side bolster resulting in faster improved retention of the occupant faster. Less occupant movement is needed to engage the airbag.

As indicated herein, while various embodiments are described herein in the context of a single lateral support, these embodiments also apply to multiple lateral supports (e.g., two lateral supports) on a seat being deployed for enhanced impact safety/protection of the user during a collision. For example, a minimum of one outer lateral support between a user and side airbag is sufficient to provide a safety break or buffer between the user and the side airbag. As a result, the lateral support 108 minimizes or eliminates any contact between the side airbag 404 and the user.

When deploying both the lateral supports 106 and 108, the system may also deploy the lateral supports 106 and 108 substantially concurrently. Deploying a lateral support on each side of the user's body cradles the user's body in the seat, which adds additional restraint to or retention of the user's body, thereby minimizing or eliminating any harmful secondary collisions and thereby minimizing or eliminating physical impact on the user's body. For example, if the user's body is sufficiently constrained to the seat, the user's body and/or head are less likely to collide with objects interior to the vehicle, including another occupant in the vehicle.

At block 306, the system deploys one or more side airbags 404. In this illustrative embodiment, the side airbag 404 deploys based on the one or more collision policies. In various embodiments, the lateral support deploys between the seat and the side airbag. This protects a user occupying the seat during a collision in various ways. For example, when the lateral support is between the seat and the side airbag, the lateral support is also between the user or passenger sitting in that seat and the side airbag. As a result, the lateral support prevents the side airbag from making contact with the user. When the side airbag deploys at a rapid rate, the side airbag makes contact with the lateral support instead of the user. As such, the side airbag cannot cause any harm to the user from impact of the side airbag.

In another example, if the user thrusts toward the side airbag due to any side impact, the user's body pushes against the deployed lateral support, which in turn pushes against the deployed side airbag. Because the lateral support is either already making contact and pushing against the side of the user or is very close to the side of the user before deployment of the lateral support, the lateral support need not inflate much during deployment before making secure contact with the body of the user. As such, the body of the user decelerates substantially immediately during the collision.

By using pre-crash and in-crash sensing, and a respective collision indication signal (e.g., pre-crash warning signal, crash detection signal, etc.), the system activates lateral supports to better support an occupant in lower severity accidents where one or more airbags are not activated. Conventional side airbags are typically activated only in high-severity collisions. This may result in a potential performance gap at lower speeds. For example, if a given impact is not sufficiently severe, the side airbag will not deploy. As such, the occupant can still get injured. Embodiments described herein avoid this problem with the deployable lateral support or seat bolster. For example, in various embodiments, the deployable lateral support may inflate before an actual crash based on predetermined pre-crash collision detection. Also, the system may inflate the lateral support even if a pre-crash warning estimates a collision at a lower speed. As such, the lateral support may deploy even if the side airbag does not deploy.

In an illustrative embodiment, at least one collision policy causes the lateral support to deploy in response to a pre-crash warning signal. For example, the system may deploy the lateral support 108 just before a crash based on a collision indication signal that is a pre-crash warning signal. As described above, a collision indication signal may include pre-crash warning signals and crash detection signals. A pre-crash warning signal is triggered when the system collects sufficient data to predict an imminent or impending crash before impact from a crash. A crash detection signal is triggered when the system detects an actual impact from a crash.

In an illustrative embodiment, at least one collision policy causes lateral support 108 to deploy in response to a pre-crash warning signal and to fully deploy/inflate before the proximate side airbag 404 is fully deployed. In some embodiments, it may take less time for the lateral support 108 to fully deploy than it takes the side airbag 404 to fully deploy. As such, if the system 210 initiates deployment of both the lateral support 108 and the side airbag 404 substantially simultaneously based on the pre-crash warning signal, the lateral support 108 will be fully deployed before the side airbag 404 is fully deployed.

In some embodiments, the system may ensure that the lateral support 108 is fully deployed before and the airbag 404 is fully deployed by initiating deployment of the lateral support 108 first, before initiating deployment of the side airbag 404. For example, even based on the same pre-crash warning signal, the system may initiate deployment of the side airbag 404 with a sufficient delay so as to enable the lateral support 108 to be fully deployed first, where the side airbag 404 is still fully deployed before actual side impact and/or before any intrusion from the colliding object 402 occurs.

There may be some embodiments where the total time to fully deploy or inflate the lateral support 108 is shorter than the total time to fully deploy or inflate the side airbag 404. As such, in some embodiments, if the system initiates deployment of the lateral support 108 and the side airbag 404 substantially simultaneously, the lateral support 108 will complete full deployment first.

In an illustrative embodiment, at least one collision policy causes the lateral support to deploy in response to a crash detection signal. In this scenario, the system 210 deploys both the lateral support 108 and the side airbag 404 substantially simultaneously responsive to the crash detection signal. As indicated herein, in some embodiments, it may take less time for the lateral support 108 to fully deploy than it takes the side airbag 404 to fully deploy. As such, if the system 210 initiates deployment of both the lateral support 108 and the side airbag 404 substantially simultaneously based on the crash detection signal, the lateral support 108 will be fully deployed before the side airbag 404 is fully deployed.

In an illustrative embodiment, at least one of the collision policies causes the lateral support to deploy at a slower rate than the deployment rate of the side airbag. By inflating more slowly, the lateral support 108 makes contact with the user 204 at a slow rate. This minimizes impact on the user 204. In some scenarios, the lateral support 108 being significantly smaller in volume than the side airbag 404 may require significantly less time to fully inflate than the side airbag 404 to fully inflate. Even if both the lateral support 108 and the side airbag 404 where to start inflating at the same time and the lateral support 108 were inflated at a slower rate than the side airbag 404, the lateral support 108 would fully inflate first, thereby enhancing protection of user 204. As such, this collision policy works well with another collision policy where both the lateral support 108 and the side airbag 404 start deploying substantially simultaneously responsive to any type of collision indication signal (e.g., pre-crash warning signal, crash detection signal, etc.).

Figure 5:
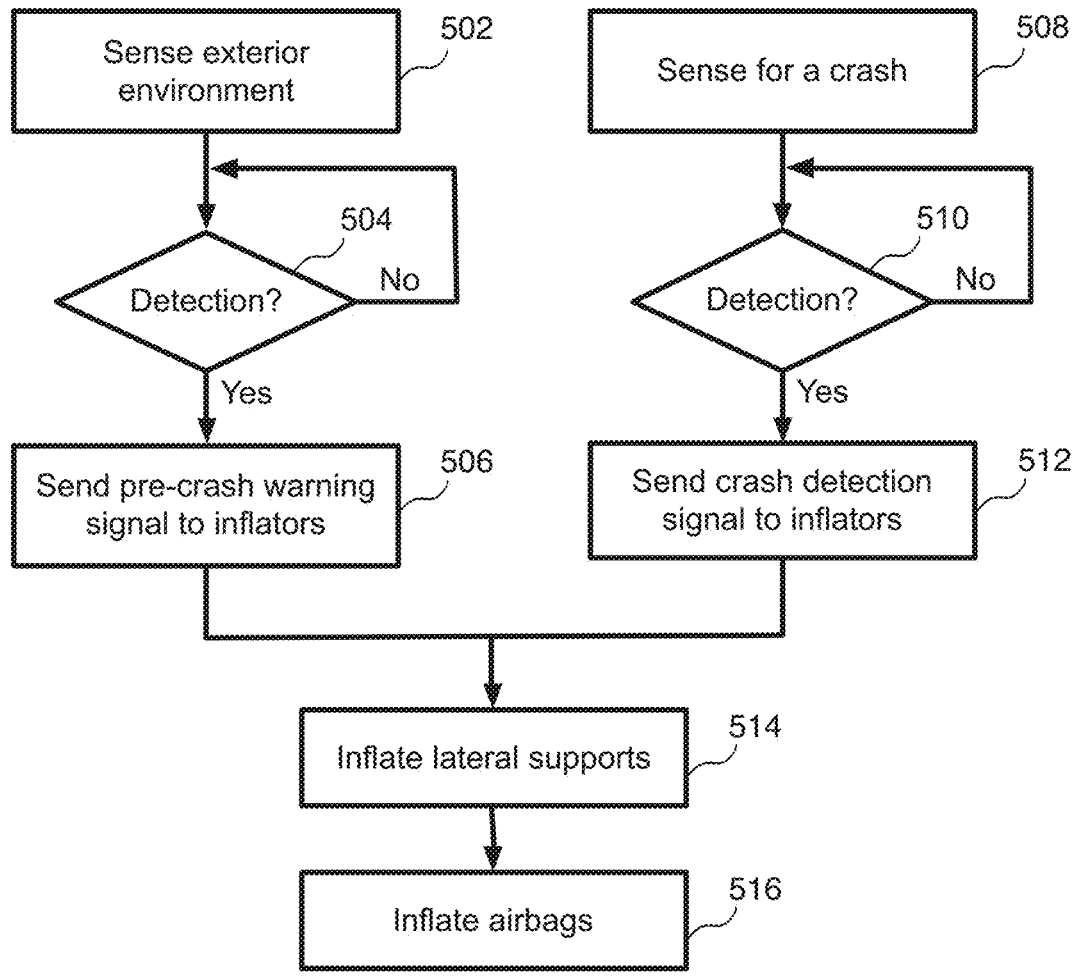
FIG. 5 is an example flow diagram of an illustrative method for enhancing side impact protection of passengers in a vehicle during a collision.

FIG. 5 is an example flow diagram of an illustrative method for enhancing side impact protection of passengers in a vehicle during a collision. Referring to both FIGS. 1 and 5, a method is initiated at block 502, where a system such as the system 210 senses the exterior environment. As indicated above, the system utilizes a variety of sensors, including exterior sensors. For example, exterior sensors may include one or more cameras, radar, etc.

At block 504, if one or more sensors do not detect sufficient data amounting to a pre-crash warning, the system continues to sense or monitor the exterior environment, at block 502. If one or more sensors detect sufficient data amounting to a pre-crash warning, the flow continues to block 506.

At block 506, the system sends a pre-crash warning signal to the appropriate inflators. In response to the pre-crash warning signal, the inflators inflate their respective lateral supports accordingly. In various embodiments, the system may include a pre-crash warning module (not shown), which processes and analyzes incoming data from the sensors 206. For example, the system may detect objects within a predetermined distance (e.g., 6 feet, 10 feet, 20 feet, etc.). The system may track such objects to compute any decrease in distance between the colliding object 402 and the vehicle 202. The system may track such objects to also compute a relative velocity of the colliding object 402 and the vehicle 202. In various embodiments, the pre-crash warning module of the system 210 may determine that a side impact or crash is imminent based on a predetermined decreasing of the distance between an object such as the colliding object 402 and the vehicle 202 and based on a predetermined minimum relative velocity between an object such as the colliding object 402 and the vehicle 202.

At block 508, the system senses for a crash. As indicated above, the system utilizes a variety of sensors, including crash sensors. For example, exterior sensors may include one or more crash sensors, etc.

At block 510, if one or more sensors do not detect a crash, the system continues to sense or monitor the exterior environment, at block 508. If one or more sensors detect a crash, the flow continues to block 512.

At block 512, the system sends a crash detection signal to the appropriate inflators. In various embodiments, the system may include a crash detection module (not shown), which processes and analyzes incoming data from the sensors 206. For example, the system may detect actual physical impact by an object such as the colliding object 402 and the vehicle 202. In various embodiments, the crash detection module of the system 210 may determine that a side impact or crash is occurring based on a predetermined amount of force acting upon the vehicle 202 by an object such as the colliding object 402.

At block 514, the system inflates the lateral supports. As indicated above, the system may utilize pyrotechnic or compressed gas inflators to deploy and inflate the lateral supports. This ensures that the lateral supports are deployed sufficiently early so as to protect the user during a side impact.

At block 516, the system inflates the appropriate airbags. In various embodiments, the inflators 208 may include inflators for both lateral supports and airbags. The locations of each of the inflators 208 and each type of the inflators 208 may vary, depending on the particular implementation.

Figure 6:
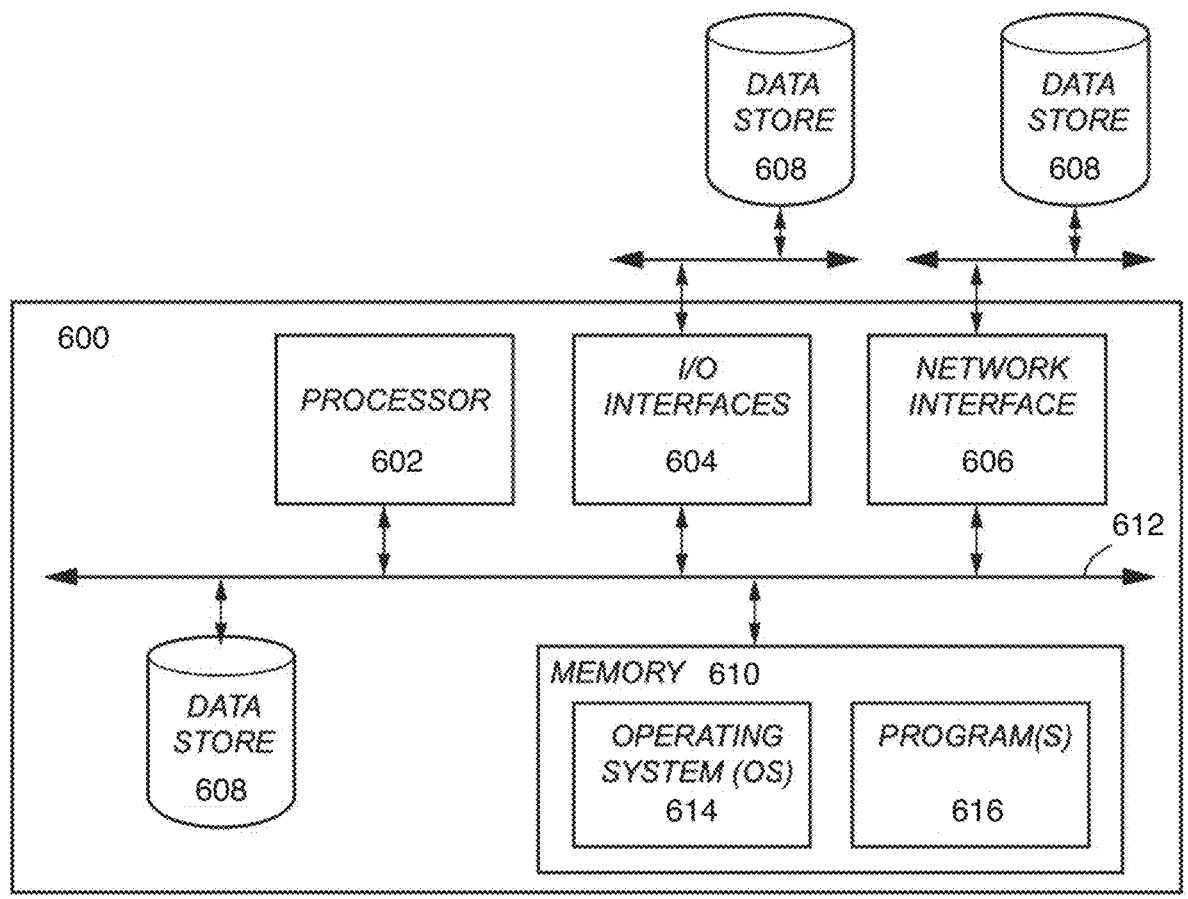
FIG. 6 is a schematic diagram illustrating a general-purpose electronic control unit (ECU) that may be utilized in conjunction with the embodiments of the present disclosure.

FIG. 6 is a schematic diagram illustrating a general-purpose electronic control unit (ECU) 600 that may be utilized in conjunction with the embodiments of the present disclosure. For example, ECU 600 may be used to implement system 210 of FIG. 2, as well as to perform implementations described herein. The ECU 600 may be a digital computer that, in terms of hardware architecture, generally includes a processor 602, input/output (I/O) interfaces 604, a network interface 606, a data store 608, and memory 610. It should be appreciated by those of ordinary skill in the art that FIG. 6 depicts the ECU 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 may be, for example, but is not limited to, one or more buses or other wired or wireless connections, as is known in the art. The local interface 612 may have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 may be any custom made or commercially available processor, a central processing unit (CPU), an auxiliary processor among several processors associated with the ECU 600, a semiconductor-based microprocessor (in the form of a microchip or chipset), or generally any device for executing software instructions. When the ECU 600 is in operation, the processor 602 is configured to execute software stored within the memory 610, to communicate data to and from the memory 610, and to generally control operations of the ECU 600 pursuant to the software instructions. The I/O interfaces 604 may be used to receive user input from and/or for providing system output to one or more devices or components.

The network interface 606 may be used to enable the ECU 600 to communicate on a network. The network interface 606 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 606 may include address, control, and/or data connections to enable appropriate communications on the network. A data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media. In one example, the data store 608 may be located internal to the ECU 600, such as, for example, an internal hard drive connected to the local interface 612 in the ECU 600. Additionally, in another embodiment, the data store 608 may be located external to the ECU 600 such as, for example, an external hard drive connected to the I/O interfaces 604 (e.g., a SCSI or USB connection). In a further embodiment, the data store 608 may be connected to the ECU 600 through a network, such as, for example, a network-attached file server.

The memory 610 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 may incorporate electronic, magnetic, optical, and/or other types of storage media. Note that the memory 610 may have a distributed architecture, where various components are situated remotely from one another but can be accessed by the processor 602. The software in memory 610 may include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A collision protection system for a vehicle, the collision protection system comprising:

a seat having a seat back;
at least one lateral support coupled to the seat back, wherein the at least one lateral support is a bolster integrated into the seat back that supports a user occupying the seat in a non-deployed configuration, and wherein the at least one lateral support deploys based on one or more collision policies; and
a side airbag, wherein the side airbag deploys from a side of the vehicle towards the seat based on the one or more collision policies, and wherein the at least one lateral support deploys by elongating forwards towards a front of the vehicle between the seat and the side airbag such that the deployed side airbag contacts the deployed at least one lateral support and not the user occupying the seat to protect the user occupying the seat during a collision.

2. The collision protection system of claim 1, wherein the at least one lateral support deploys using a pyrotechnic or compressed gas inflater.

3. The collision protection system of claim 1, wherein the at least one lateral support further deploys by inflating against a side of the user.

4. The collision protection system of claim 1, wherein the at least one lateral support comprises two lateral supports, and wherein the two lateral supports deploy to enhance protection of the user.

5. The collision protection system of claim 1, wherein at least one collision policy of the one or more collision policies causes the at least one lateral support to deploy in response to a pre-crash warning signal.

6. The collision protection system of claim 1, wherein at least one collision policy of the one or more collision policies causes the at least one lateral support to deploy in response to a crash detection signal.

7. The collision protection system of claim 1, wherein at least one collision policy of the one or more collision policies causes the at least one lateral support to deploy at a slower rate than a deployment rate of the side airbag.

8. A side-impact protection assembly for a vehicle, the side-impact protection assembly comprising:
   at least one lateral support coupled to a seat back of a seat, wherein the at least one lateral support is a bolster integrated into the seat back that supports a user occupying the seat in a non-deployed configuration, and wherein the at least one lateral support deploys based on one or more collision policies; and
   a side airbag, wherein the side airbag deploys from a side of the vehicle towards the seat based on the one or more collision policies, and wherein the at least one lateral support deploys by elongating forwards towards a front of the vehicle between the seat and the side airbag such that the deployed side airbag contacts the deployed at least one lateral support and not the user occupying the seat to protect the user occupying the seat during a collision.

9. The side-impact protection assembly of claim 8, wherein the at least one lateral support deploys using a pyrotechnic or compressed gas inflater.

10. The side-impact protection assembly of claim 8, wherein the at least one lateral support further deploys by inflating against a side of the user.

11. The side-impact protection assembly of claim 8, wherein the at least one lateral support comprises two lateral supports, and wherein the two lateral supports deploy to enhance protection of the user.

12. The side-impact protection assembly of claim 8, wherein at least one collision policy of the one or more collision policies causes the at least one lateral support to deploy in response to a pre-crash warning signal.

13. The side-impact protection assembly of claim 8, wherein at least one collision policy of the one or more collision policies causes the at least one lateral support to deploy in response to a crash detection signal.

14. The side-impact protection assembly of claim 8, wherein at least one collision policy of the one or more collision policies causes the at least one lateral support to deploy at a slower rate than a deployment rate of the side airbag.

15. A method comprising:
   detecting a collision indication signal;
   deploying at least one lateral support coupled to a seat back of a seat of a vehicle, wherein the at least one lateral support is a bolster integrated into the seat back that supports a user occupying the seat in a non-deployed configuration, and wherein the at least one lateral support deploys based on one or more collision policies; and
   deploying a side airbag, wherein the side airbag deploys from a side of the vehicle towards the seat based on the one or more collision policies, and wherein the at least one lateral support deploys by elongating forwards towards a front of the vehicle between the seat and the side airbag such that the deployed side airbag contacts the deployed at least one lateral support and not the user occupying the seat to protect the user occupying the seat during a collision.

16. The method of claim 15, wherein the at least one lateral support deploys using a pyrotechnic or compressed gas inflater.

17. The method of claim 15, wherein the at least one lateral support further deploys by inflating against a side of the user.

18. The method of claim 15, wherein the at least one lateral support comprises two lateral supports, and wherein the two lateral supports deploy to enhance protection of the user.

19. The method of claim 15, wherein at least one collision policy of the one or more collision policies causes the at least one lateral support to deploy in response to a pre-crash warning signal.

20. The method of claim 15, wherein at least one collision policy of the one or more collision policies causes the at least one lateral support to deploy in response to a crash detection signal.

* * * * *